United States Patent
Iizumi et al.

(10) Patent No.: US 8,469,595 B2
(45) Date of Patent: Jun. 25, 2013

(54) MOTION DEVICE AND MOVING DEVICE

(75) Inventors: Makoto Iizumi, Tokyo (JP); Akimasa Yoshida, Tokyo (JP); Shinji Aoki, Tokyo (JP)

(73) Assignee: THK Co., Ltd., Tokyo (JP)

(\*) Notice: Subject to any disclaimer, the term of this patent is extended or adjusted under 35 U.S.C. 154(b) by 590 days.

(21) Appl. No.: 12/674,813

(22) PCT Filed: Aug. 26, 2008

(86) PCT No.: PCT/JP2008/065159
§ 371 (c)(1),
(2), (4) Date: Feb. 23, 2010

(87) PCT Pub. No.: WO2009/028482
PCT Pub. Date: Mar. 5, 2009

(65) Prior Publication Data
US 2011/0041629 A1 Feb. 24, 2011

(30) Foreign Application Priority Data
Aug. 31, 2007 (JP) .................................. 2007-226649

(51) Int. Cl.
*F16C 29/06* (2006.01)
*F16D 3/06* (2006.01)
(52) U.S. Cl.
USPC ............................................. 384/43; 464/168
(58) Field of Classification Search
USPC ............ 384/13, 15, 43–45; 74/89.32, 424.85; 464/168
See application file for complete search history.

(56) References Cited

U.S. PATENT DOCUMENTS

| | | | | |
|---|---|---|---|---|
| 3,353,876 A | * | 11/1967 | Moyer | 384/43 |
| 3,545,826 A | * | 12/1970 | Magee et al. | 384/43 |
| 3,762,781 A | * | 10/1973 | Zeldman | 384/43 |
| 4,344,657 A | | 8/1982 | Borel | |
| 4,456,312 A | * | 6/1984 | Rogers et al. | 384/43 |
| 4,620,351 A | | 11/1986 | Teramachi | |
| 4,764,154 A | | 8/1988 | Teramachi | |
| 5,558,442 A | * | 9/1996 | Ng | 384/43 |
| 6,099,410 A | * | 8/2000 | Mizutani | 464/168 |
| 6,409,387 B1 | * | 6/2002 | Yokohari | 384/43 |
| 6,481,892 B1 | * | 11/2002 | Agostini | 384/43 |
| 6,637,941 B2 | * | 10/2003 | Greiner | 384/43 |

FOREIGN PATENT DOCUMENTS

| | | |
|---|---|---|
| AT | 1112 E | 6/1982 |
| JP | 58-142021 A | 8/1983 |
| JP | 5-47541 U | 6/1993 |

OTHER PUBLICATIONS

International Search Report of PCT/JP2008/065159, mailing date of Dec. 2, 2008.
German Office Action dated Feb. 28, 2013, issued in corresponding German Patent Application No. 112008002285.2, with English translation (11 pages).

\* cited by examiner

*Primary Examiner* — Marcus Charles
(74) *Attorney, Agent, or Firm* — Westerman, Hattori, Daniels & Adrian, LLP (57) ABSTRACT

A motion device includes an orbital element, and a moving element into which the orbital element is inserted, the moving element guided so as to be able to reciprocate in a longitudinal direction of the orbital element, wherein at ends of the moving element, cylindrical protrusions into which the orbital element is inserted are formed and protrude in the longitudinal direction of the orbital element so as to be pivotally supportable on bearings, and total size around the orbital element in a direction perpendicular to the longitudinal direction of the protrusions is smaller than that of the moving element.

8 Claims, 5 Drawing Sheets

FIG. 5

MOTION DEVICE AND MOVING DEVICE

CROSS-REFERENCE TO RELATED APPLICATIONS

The present invention claims priority from Japanese Patent Application No. 2007-226649 filed Aug. 31, 2007, which is hereby incorporated by reference herein in its entirety.

BACKGROUND OF THE INVENTION

1. Field of the Invention

The present invention relates to a motion device and a moving device which relatively move moving elements along an extended orbital element such as a ball spline, a ball screw and a guide.

2. Description of Related Art

In the past, in order to move a workpiece or a tool with high accuracy in machinery such as a machine tool and various industrial machines, or in order to operate movable members with high accuracy in precision instruments or the like, according to various applications, motion devices such as ball splines, ball screws and guides of different sizes are used. In particular, recently, according to the increasing compactness of machines or mechanisms, compactness of the motion devices themselves constituting the machines are increasingly desired.

In general, the motion device includes an orbital element that is installed so as to be extended, and moving elements into which the orbital element is inserted, movably supported in the extended direction. Because rolling elements including a plurality of balls or the like are supported at the inner portions of the moving elements, the moving elements and the orbital element are capable of smoothly moving relative to each other via the rolling elements. In addition, the moving elements and the orbital element are moved relative to each other, which cause a member attached to the motion device to move.

In order to hold the rolling elements at the inner portions of the moving elements, both ends of the orbital elements in the longitudinal direction are in contact with two lids so as to be narrowed and are sealed, and both ends and the two lids are formed integrally with each other. In general, fixation of the lids to the moving elements is performed by a screw fixing. In addition, screws are screwed into screw holes that are extended and installed in a direction perpendicular to contact surfaces of the lids and the moving elements and are fixed, so as to seal the rolling elements within the moving elements.

Furthermore, in patent document 1, there is described a motion device in which the moving elements are formed in approximately cylindrical shapes and outer periphery surfaces are pivotally supported on bearings. The motion device is configured in such a manner that the bearings and the orbital element are capable of moving relatively in the longitudinal direction of the orbital element and accordingly are able to rotate relatively even in a circumferential direction of the moving elements. Thus, the degree of freedom of the motion is increased and it is possible to apply in various applications. In addition, inner peripheries of balls (bearing rolling elements) to be built in the bearings are not received by the inner rim of the bearings but are supported and rolling-driven by circumference grooves (rolling surfaces of bearing rolling element), which are formed on the outer periphery surfaces of the moving elements, so total size of the device in a diameter direction are reduced so as to be small.

[Patent Citation 1] Japanese Patent Application Laid-Open Publication No. 58-142021

BRIEF SUMMARY OF THE INVENTION

Technical Problem

However, the moving elements and the lids are screwed and fixed into the screw holes, which extend in the longitudinal direction of the orbital element, using screws.

Thus, on the contact surface (side surface) thereof, it is required to secure a surface area more than a certain amount so as to provide the screw holes. For this reason, the total size of the moving elements and the lids in a direction perpendicular to in the longitudinal direction cannot be formed in sizes less than or equal to a certain amount, and there is a limitation on miniaturization. Especially, in a motion device used in precision equipment or the like, corresponding to compaction of the equipment, a new increase in compactness of the motion device itself is required, and there is a problem of how to reduce and miniaturize the total size of the device.

Furthermore, as described in Patent Document 1, even in a motion device in which the outer periphery surfaces of the moving elements are pivotally supported by the bearings, the moving elements and the bearings are integrated and miniaturized, but it is still insufficient, and a new miniaturization method is required. Thus, there is a problem of how to keep the total size small. In addition, even in a moving device in which the motion device is combined with a driving source, miniaturization is similarly required.

The present invention has been achieved in view of the above circumstances, and an object thereof is to provide a motion device and a moving device that can reduce the total size in a direction perpendicular to the longitudinal direction of the orbital element to extremely small sizes and is capable of achieving miniaturization.

Technical Solution

In order to achieve the above described object, the present invention suggests the following structures. That is, the present invention is related to a motion device that includes an orbital element, and moving elements into which the orbital element is inserted, guided so as to be able to reciprocate in the longitudinal direction of the orbital element, and at an end of the moving element, cylindrical protrusions into which the orbital element is inserted, protruding in the longitudinal direction, being installed so as to be pivotally supportable on bearings. In addition, the total size around the orbital element in a direction perpendicular to the longitudinal direction of the protrusions is formed so as to be smaller than the total size of the moving elements.

With the motion device according to the present invention, because the protrusions are installed so as to be pivotally supportable on the bearings, when the protrusions are pivotally supported by the bearings, the total size in the direction perpendicular to the longitudinal direction of the orbital element is reduced, for example, substantially by 50%, as compared to a conventional case where the bearings are pivotally supported on and attached to the exterior surfaces of the moving elements. Thus, because the motion device can be miniaturized by forming the total size extremely small, it is possible to apply to various applications and various desires. In addition, by installing the bearings in the motion device, the bearings and the orbital element are formed such that they cannot only move relatively in the longitudinal direction of the orbital element, but also can rotate relatively even in the circumferential direction around the orbital element. Thus, since degree of freedom of the motion direction is increased, it is possible to apply to still further applications.

In addition, in the motion device of the present invention, on the exterior surfaces of the protrusions, rolling surfaces of bearing rolling element for rolling-driving the bearing rolling elements to be built in the bearings are formed and accordingly, the protrusions and the bearings may be integrally formed. As a result, on the exterior surfaces of the protrusions, bearings are not separately formed, but rolling surfaces of bearing rolling element such as grooves for supporting bearing rolling elements including balls or the like to be built in the bearings is installed at the inner side thereof, and the protrusions and the bearings are integrally formed. Thus, the total size of the bearings in the direction perpendicular to the longitudinal direction of the orbital element can be formed to be extremely small, and accordingly, in the motion device, the numbers of the components thereof are reduced and the numbers of the assembling processes are decreased, with the result that a productivity is improved.

In addition, the motion device of the present invention, the moving elements hold rolling elements therein, the rolling elements are sealed in the inner portions of the moving elements by the lids installed at the ends in the longitudinal direction of the moving elements, and the protrusions may be formed integrally with the lids. As a result, the protrusions are formed integrally with the lids so as to be extended at the sides of the lids opposite to the moving elements and accordingly can be pivotally supported by the bearings. Thus, the lids are closely fixed to the end of the moving element and seal the rolling elements in the inner portions of the moving elements. Therefore, the protrusions thereof can be pivotally supported on the bearings, and the numbers of the components constituting the motion device can be further reduced. Thereby, the numbers of the assembling processes are decreased, and an improvement in productivity is achieved.

In addition, in the motion device of the present invention, the moving elements hold the rolling elements therein, the rolling elements are sealed in the inner portions of the moving elements by the lids installed at the ends in the longitudinal direction of the moving elements. Furthermore, an exterior member is installed so as to cover the moving elements and the lids, the moving elements and the lids are fixed to each other by the exterior member, and the protrusions may be formed integrally with the exterior member. As a result, since the moving members and the lids are closely fixed to each other by the exterior member, at ends in the exterior member in the longitudinal direction, protrusions in which the total size in a direction perpendicular to the longitudinal direction of the orbital element are further reduced as compared to that of the moving elements are extended from the exterior member so as to be formed integrally therewith. In addition, the protrusions can be pivotally supported on the bearings. Thus, the exterior member fixes both the moving elements and lids, and the protrusions can be pivotally supported on the bearings. Therefore, the number of components constituting the motion device can be further reduced and the numbers of the assembling processes are decreased, and the productivity is improved.

In addition, the present invention relates to a motion device including an orbital element and a moving element into which the orbital element is inserted, guided so as to be able to reciprocate in a longitudinal direction of the orbital element. The moving element holds rolling elements therein, and the rolling elements are sealed in the inner portions of the moving elements by lids which are installed at ends of the moving elements in the longitudinal direction. An exterior member is installed so as to cover the moving elements and the lids, and the moving elements and the lids are fixed to each other by the exterior member.

With the motion device according to the present invention, the moving elements and the lids are closely fixed to each other in the longitudinal direction by means of the exterior member installed so as to cover the moving elements and the lids. Thus, unlike a conventional motion device, there is no need to fix the moving elements and the lids by being screwed into the screw holes which are extended and installed so as to be perpendicular to the contact surface. Thus, in the contact surface, there is no need to secure a certain surface area in order to form screw holes. Thus, in the motion device, the total size of the moving elements along a direction perpendicular to the longitudinal direction of the orbital element can be extremely reduced and miniaturized. Thus, the motion device of the present application can be used in various applications and various desires.

Furthermore, in the motion device of the present invention, the exterior members are oppositely disposed at both ends of the moving elements, convex portions and concave portions are formed at the ends facing each other, and the convex portions and the concave portions may be disposed so as to be engaged with each other. In this manner, the convex portions and the concave portions of each exterior member oppositely disposed are engaged with each other. Thus, for example, even when the length in the longitudinal direction of the orbital element is short, exterior members can take the length in the longitudinal direction. Because of the length, the moving elements and the lids can be strongly fixed. Furthermore, the exterior members oppositely disposed can position mutual relative positions along the circumferential direction around the orbital element, by means of the convex portions and the concave portions to be engaged with each other.

Furthermore, in the motion device of the present invention, fixation of the moving elements and the lids by the exterior members may be glued. In this manner, the fixation is glued by an adhesive that is applied to at least any one of the exterior surfaces of the moving elements, the lids and the interior surfaces of the exterior members. Hence, unlike in the conventional device, there is no defect such that the screws are lost or worn out by being used for fixation of the moving elements and the lids causing deterioration of workability or reduction of productivity. In addition, the fixation by the glue facilitates an automation of a production.

In addition, in the motion device of the present invention, the exterior members are formed integrally with the lids and disposed so as to cover the moving elements. The moving elements and the lids may be fixed to each other by means of the exterior members. As a result, because the numbers of the components constituting the motion device can be further reduced, the numbers of the assembling processes can be decreased and a productivity can be improved.

Furthermore, the present invention may be a moving device that includes the above-described motion device and a driving source for driving the motion device in the longitudinal direction of the orbital element. As the driving source, a linear motor mechanism is useable, for example. In addition, if the driving source is combined in parallel with the motion device in the longitudinal direction, it is possible to form a moving device in which the total size in a direction perpendicular to the longitudinal direction of the orbital element is extremely small. Furthermore, the moving device is excellent in motion controllability and positional accuracy. Therefore, the moving device of the present invention can be used in various applications.

Advantageous Effects

With the motion device and the moving device according to the present invention, the total size in the direction perpendicular to the longitudinal direction of the orbital element is reduced to be extremely small, miniaturization can be accomplished. Accordingly, the moving device can be independently moved.

EXPLANATION OF REFERENCE

1 BALL SPLINE (MOTION DEVICE)
2 SPLINE SHAFT (ORBITAL ELEMENT)
3 MOVING ELEMENT
4 LID
4a DIRECTION CHANGING PATHS OF THE ROLLING ELEMENTS
4b LID
5 ROLLING ELEMENTS
6 CAPS (EXTERIOR MEMBERS)
6a PROTRUSIONS
6b OUTER PERIPHERAL SURFACES (EXTERIOR SURFACES)
6c ROLLING GROOVES OF THE BEARING ROLLING ELEMENT (ROLLING SURFACE OF THE BEARING ROLLING ELEMENT)
6d COVER (EXTERIOR MEMBER)
6e CONVEX PORTIONS
6f CONCAVE PORTIONS
7 BEARINGS
7a BEARING ROLLING ELEMENTS
8 LINEAR MOTOR MECHANISM (DRIVING SOURCE)
11 BALL SPLINE (MOTION DEVICE)
21 BALL SPLINE (MOTION DEVICE)
31 BALL SPLINE (MOTION DEVICE AND MOVING DEVICE)
L AXIS DIRECTION OF SPLINE SHAFT (LONGITUDINAL DIRECTION)

DETAILED DESCRIPTION OF THE INVENTION

Figure 1:
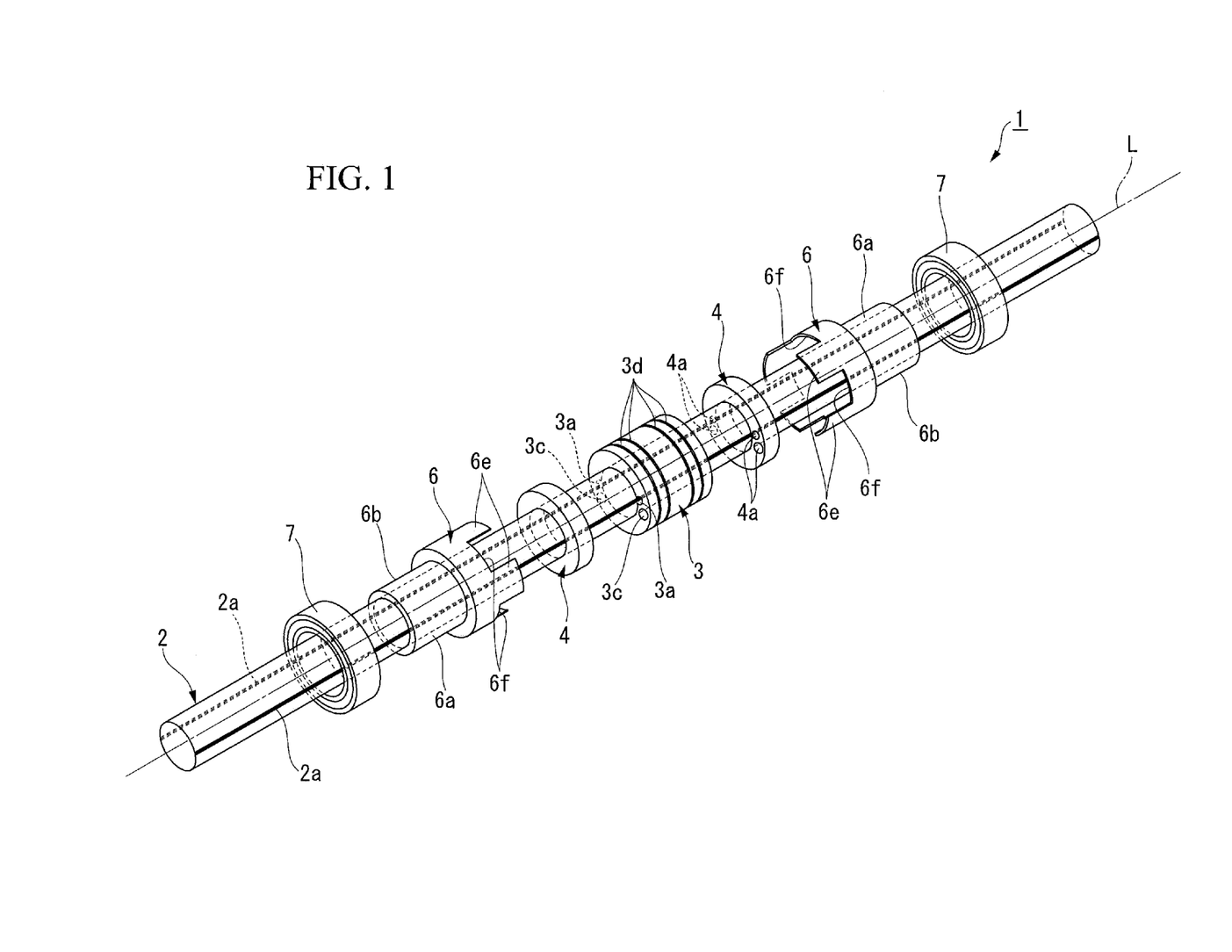
FIG. 1 is an exploded perspective view that shows a schematic structure of ball spline as a motion device in one embodiment of the present invention.
Figure 2:
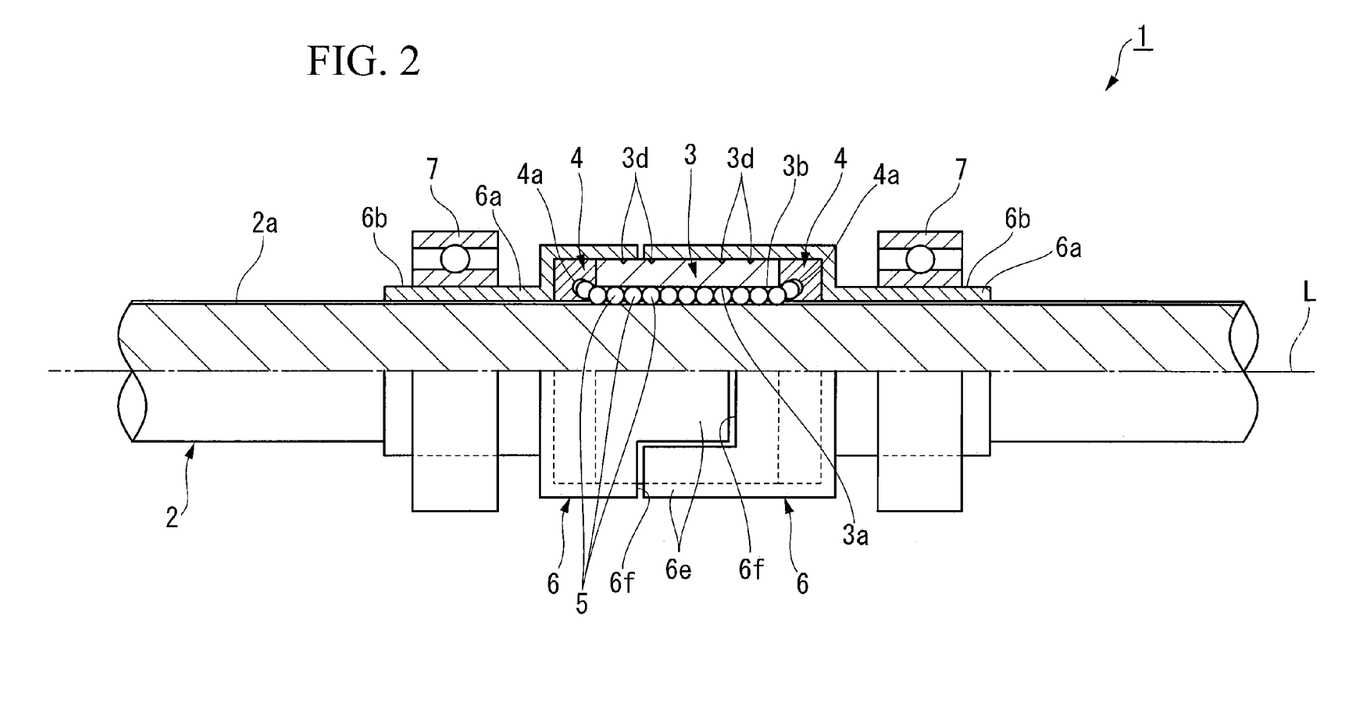
FIG. 2 is a plan view that shows a schematic structure of ball spline as a motion device in one embodiment of the present invention.
Figure 3:
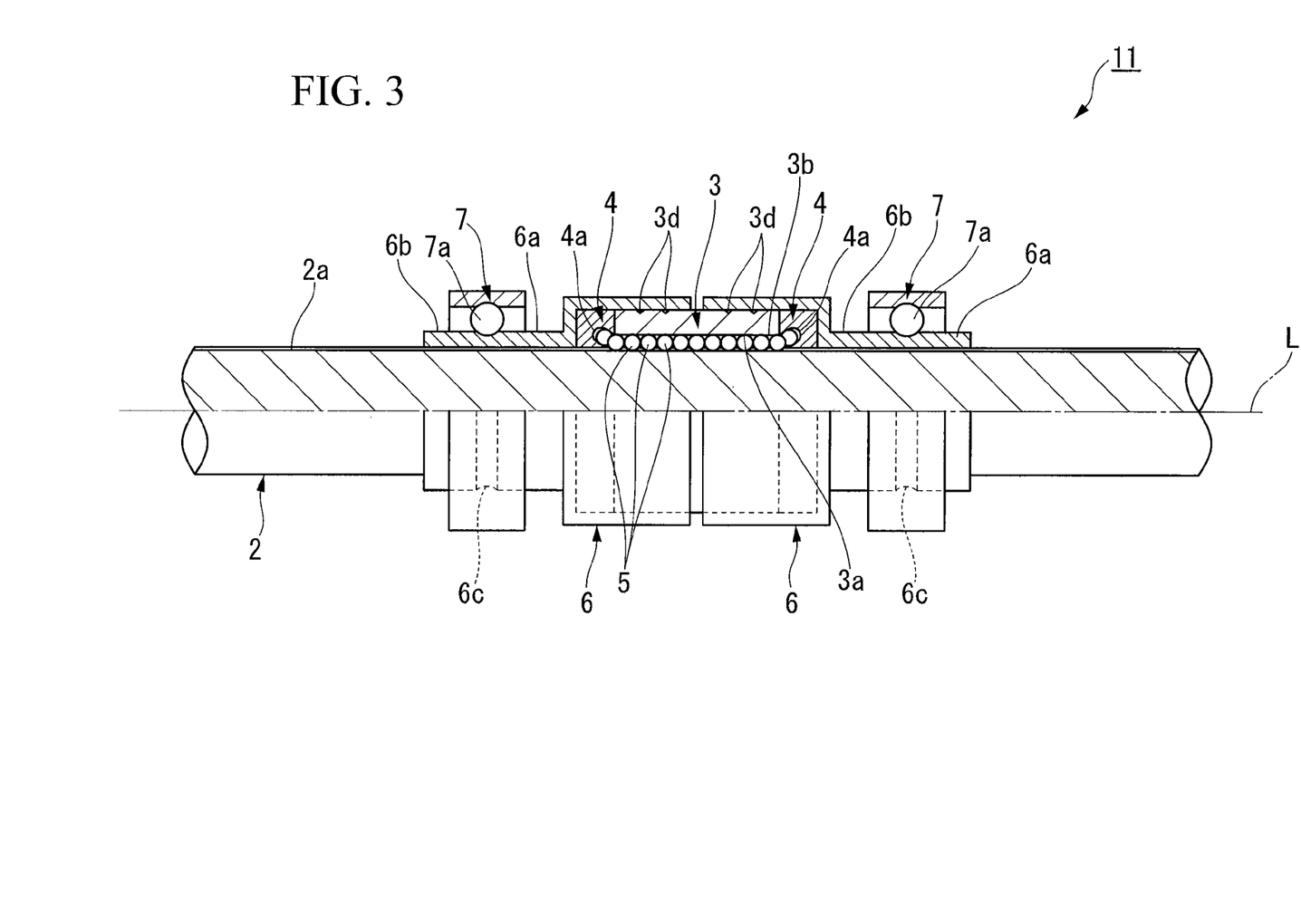
FIG. 3 is a plan view that shows a schematic structure of a second modified example of a ball spline.
Figure 4:
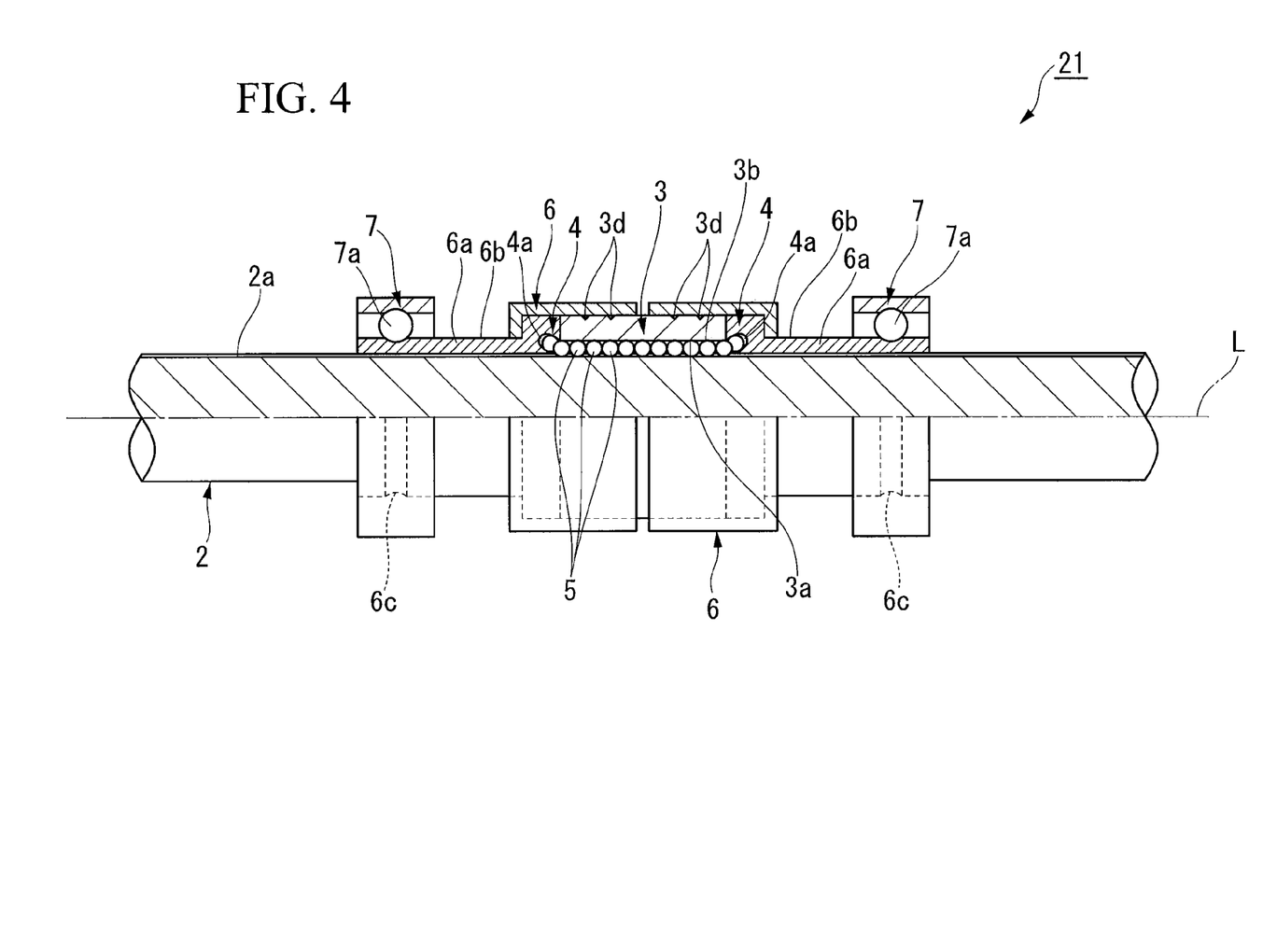
FIG. 4 is a plan view that shows a schematic structure of a third modified example of a ball spline.
Figure 5:
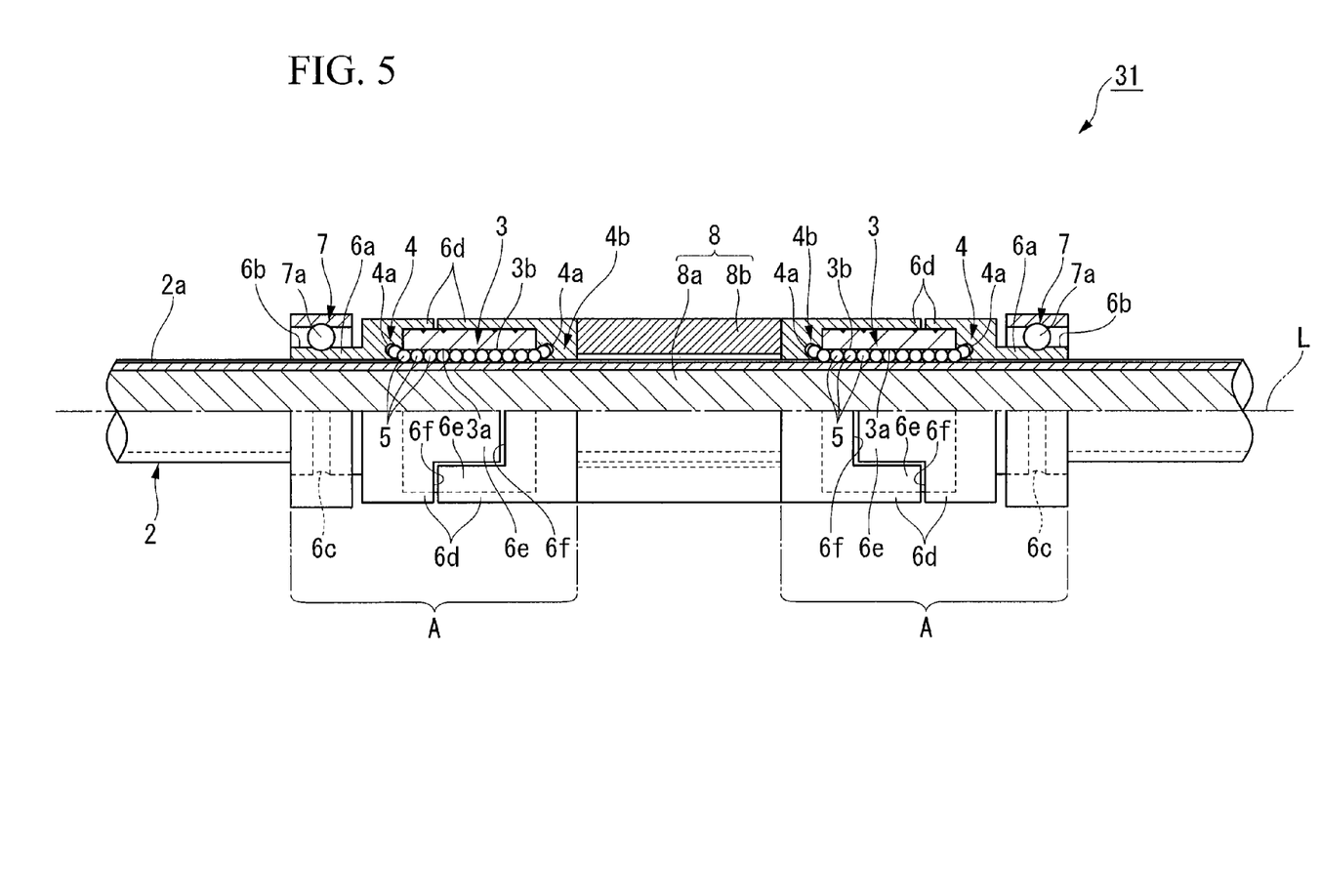
FIG. 5 is a plan view that shows a schematic structure of a fourth modified example of a ball spline.

Hereinafter, with reference to the drawings, embodiments of the present invention will be described. FIG. 1 is an exploded perspective view that shows a schematic structure of a ball spline as a motion device in one embodiment of the present invention. FIG. 2 is a plan view that shows a schematic structure of the ball spline in FIG. 1. FIGS. 3 to 5 are plan views showing schematic structures of modified examples of the ball spline.

As shown in FIGS. 1 and 2, a ball spline 1 as a motion device of the present invention includes a spline shaft (orbital element) 2 having an extended round rod shape or pipe shape, and on the outer peripheral surface of the spline shaft 2, there are formed two rolling element rolling grooves (rolling element rolling surfaces) 2a which extend along an axial direction (longitudinal direction) L thereof. The two rolling element rolling grooves 2a are also oppositely disposed in a diameter direction of the spline shaft 2. In addition, a cylindrical moving element 3 is installed, and the spline shaft 2 is inserted into the moving element 3. On an inner peripheral surface of the moving element 3, a rolling groove (rolling surface of the load rolling element) 3a of two load rolling elements are formed so as to each be opposed to the rolling element rolling groove 2a.

As shown in FIG. 2, a linear-shaped space, which is formed in the axial direction L by the rolling element rolling groove 2a and rolling grooves 3a of the load rolling element, is a rolling path 3b of the load rolling element and passes through the moving element 3 in the axial direction L. In addition, as shown in FIG. 1, between the inner peripheral surface and the outer peripheral surface of the moving element 3, there is installed linear-shaped rolling element return paths 3c which extend approximately in parallel with rolling paths 3b of the load rolling element and similarly passes through the moving element 3. Furthermore, on the outer peripheral surface of the moving element 3, a plurality of adhesive filling grooves 3d is formed in a circumferential direction.

Furthermore, as shown in FIG. 2, at both ends of the moving element 3 in the axial direction L, ring-shaped lids 4 into which the spline shaft 2 is inserted are in contact with the moving element 3. Outer diameter sizes of the lids 4 are approximately the same as those of the moving element 3. Furthermore, the lids 4 include direction changing paths 4a of the rolling element, in the vicinity of the surfaces contacting the end faces of the moving element 3. The direction changing paths 4a of the rolling element are semicircular ring-shaped spaces that connect the rolling paths 3b of the load rolling element with rolling elements return paths 3c which are disposed adjacent to the rolling paths 3b of the load rolling element. In approximately oval ring-shaped or circuit-shaped spaces which are formed by the rolling paths 3b of the load rolling element, the rolling elements return paths 3c, and the direction changing paths 4a of the rolling element, there are accommodated a plurality of rolling elements 5 constituted by balls in a freely circulated manner.

As a result, the rolling elements 5 which are rolled in the rolling paths 3b of the load rolling element, are introduced from one end of the rolling paths 3b of the load rolling element into the direction changing path 4a of the rolling element and facing directions thereof are inverted, resulting in a change in the direction. Thereafter, the rolling elements 5 roll in the rolling element return paths 3c and are introduced into the direction changing path 4a of the rolling element from the other end. Then, the directions of the rolling element 5 are changed. Thereby, the rolling elements 5 can enter the other end of the rolling paths 3b of the load rolling element again and roll therein, thus an infinite circulation is possible. In addition, with the rolling of the rolling elements 5 roll, the moving element 3 and the spline shaft 2 are hereby smoothly movable relatively in the axial direction L.

In addition, at the outer sides of the lids 4 in the axial direction L, substantially multistage cylindrical caps (exterior member) 6 are each oppositely disposed and are loosely fitted to the spline shaft 2. The inner periphery surfaces of cylindrical portions of the caps 6 in a diameter direction are set to be slightly larger than the outer diameter of the moving element 3 and the lids 4. Thus, the moving element 3 and the lids 4 are inserted into the caps 6 so as to be inscribed in the inner periphery surface of the caps 6. In addition, at the ends of the caps 6 facing each other, convex portions 6e and concave portions 6f are disposed so as to be alternately engaged with each other in the circumferential direction.

Furthermore, at least at one of the outer periphery surfaces of the moving element 3 and the lids 4 or the inner periphery surfaces of the caps 6, adhesive is applied therein in advance. Thus, the moving element 3, the lids 4 and the caps 6 are fixed by an adhesive so as to be closely adhered to each other in the axial direction L. In addition, the adhesive filling grooves 3d installed at the outer peripheral surface of the moving element 3 is formed to hold the adhesive and to enhance adhesive properties. Furthermore, with respect to the adhesive, it is preferable that the adhesive not be stoutly inserted between the surfaces by which the moving element 3 is in contact with the lids 4, so as to satisfactorily roll the rolling elements 5 held therein. In this manner, the lids 4 are disposed at both end faces of the moving element 3, and caps 6 are each oppositely disposed at the outer sides of the lids 4 in the axial direction L. The caps 6 are fixed in such a manner that the lids 4 are closely adhered to the inside moving element 3 from the outside.

In addition, the cylindrical portions of the caps 6 formed at small diameters are protrusions 6a that protrude from the sides opposite to the moving element 3 sides of the lids 4. The diameters of the inner peripheral surfaces of the protrusions 6a are slightly larger than the outer diameter of the spline shaft 2. The outer peripheral surfaces (exterior surfaces) 6b of the protrusions 6a are configured such that the outer diameter of the protrusions 6a are smaller than the moving element 3 and the lids 4. The bearings 7 are fitted to the outer peripheral surfaces 6b so as to pivotally support the protrusions 6a. The bearings 7 are fixed so as not to be movable in the axial direction L and the outer diameters thereof are slightly larger than those of the caps 6.

According to the ball spline 1 of this embodiment, the moving element 3 and the lids 4 are fixed so as to be closely adhered to each other in the axial direction L by means of the caps 6 that are disposed to cover the moving element 3 and the lids 4. Thus, unlike a conventional ball spline, there is no need to provide screw holes that extend in the axial direction L perpendicular to the contact surfaces of the moving element 3 with the lids 4 so as to fix the moving element 3 and the lids 4 by screwing. Thus, there is no need to secure more than a certain surface area in order to provide the screw holes on the contact surfaces the moving element 3 with the lids 4. Thus, the outer diameter sizes of the moving element 3 and the lids 4 can be greatly reduced, whereby the ball spline 1 can be miniaturized.

In addition, the ball spline 1 is configured such that the protrusions 6a installed at the outer ends of the caps 6 in the axial direction L are reduced in diameters further than the moving element 3 and the lids 4. Furthermore, the bearings 7 are disposed at the outer peripheral surfaces 6b of the protrusions 6a, and the protrusions 6a are pivotally supported by the bearings 7. Thus, the outer diameter sizes of the bearings 7 being the maximum diameter portions of the device are reduced by about 50% as compared to the conventional case where the bearings 7 are disposed outside of the moving element 3 in the diameter direction and are pivotally supported thereon. Thus, the outer diameter of the ball spline 1 can be greatly reduced and miniaturization can be accomplished. Therefore, the ball spline 1 can also be used in various applications and various desires. In addition, the bearings 7 are installed in the ball spline 1. The bearings 7 and the spline shaft 2 are not only moved relatively in the axial direction L of the spline shaft 2, but also are rotated relatively in the circumferential direction around the spline shaft 2. Thereby, the degree of freedom in the motion direction of the ball spline 1 is increased, hence increasing the application of the ball spline 1.

In addition, the ball spline 1 is configured such that the fixation of the moving element 3 and the lids 4 by the caps 6 is glued by an adhesive that is applied to at least one of the outer peripheral surfaces of the moving element 3 and the lids 4 and the inner peripheral surfaces of the caps 6. Thus, unlike a conventional ball spline, there is no defect such that the screws are lost or worn out by being used for the fixation of the moving element 3 and the lids 4 causing deterioration of workability or reduction of productivity. In addition, the fixation by the adhesive facilitates the automation of production.

In addition, the ball spline 1 is configured such that each of the convex portions 6e and concave portions 6f of the caps 6 oppositely disposed is engaged with each other. Thereby, even when the lengths of the caps 6 in the axial direction L are short, there is enough length in the axial direction L fixing the moving element 3 and the lids 4, thereby the moving element 3 and the lids 4 can be strongly fixed. Furthermore, the caps 6 oppositely disposed can position relative to each other in the circumferential direction around the spline shaft 2 with a high accuracy, by means of the convex portions 6e and the concave portions 6f which are engaged with each other.

In addition, the ball spline 11 shown in FIG. 3 is a second modified example of the present embodiment. In the ball spline 11, rolling grooves (rolling surfaces of bearing rolling element) 6c of the bearing rolling element are provided in the circumferential direction of the outer peripheral surfaces 6b of the protrusions 6a. Furthermore, the inner peripheral sides of the bearing rolling elements 7a, which are built in the bearings 7 for pivotally supporting the protrusions 6a, are supported by the rolling grooves 6c of the bearing rolling element, instead of inner rim members of the bearings 7. Accordingly, the protrusions 6a and the bearings 7 are integrally formed. With the above-described structure, the outer diameter of the bearings 7 can be further reduced. Furthermore, the numbers of the components of the ball spline 11 are decreased, so as to decrease the numbers of the assembling processes, resulting in an improvement of the productivity. In addition, as shown in FIG. 3, the caps 6 may be configured such that the above-described convex portions 6e and concave portions 6f are not formed at the ends facing each other.

A ball spline 21 shown in FIG. 4 is a third modified example of the present embodiment. In the ball spline 21, the protrusions 6a extend from the lids 4 outwardly in the axial direction L. In addition, rolling grooves 6c of the bearing rolling element are installed on the outer periphery surfaces 6b of the protrusions 6a. The rolling grooves 6c of the bearing rolling element support the inner periphery sides of the bearing rolling elements 7a of the bearings 7 for pivotally supporting the protrusions 6a with the rolling grooves 6c of the bearing rolling element, instead of inner rim members of the bearings 7. Accordingly, the protrusions 6a and the bearings 7 are integrally formed. Thus, since the lids 4 and the bearings 7 are integrally formed in the ball spline 21, the numbers of the components are reduced so as to decrease the numbers of assembling processes, and the productivity is improved.

Ball spline 31 shown in FIG. 5 is a fourth modified example of the present embodiment. The lids 4 have proximately multistage cylindrical shapes, and cylindrical portions formed at sides of the lids 4 having large outer diameters become covers (exterior members) 6d to cover the outer periphery surface of the moving element 3 with the inner periphery surfaces of the covers 6d. The lids 4 are closely adhered and fixed to the moving element 3. In addition, the covers 6d are oppositely disposed at both sides in the axial direction L with the moving element 3 being sandwiched therebetween. The covers 6d are constituted by convex portions 6e and concave portions 6f, and the convex portions 6e and the concave portions 6f are alternately engaged with each other in the circumferential direction.

In addition, protrusions 6a are formed at both ends of the lids 4 in the axial direction L. Rolling grooves 6c of the bearing rolling element are formed on the outer periphery surfaces 6b of the protrusions 6a. The rolling grooves 6c of the bearing rolling element support the inner periphery sides of the bearing rolling elements 7a of the bearings 7 that pivotally support the protrusions 6a. In addition, the protrusions 6a and the bearings 7 are integrally formed. Thus, the lids 4 and the bearings 7 are integrally formed. In addition, in the fourth modified example, the above-described caps 6 are not used. Furthermore, lids 4b disposed opposite to the sides of the protrusions 6a in the axial direction L of the moving elements 3 have substantially cylindrical shapes, and the protrusions 6a such as the lids 4 are not installed. In addition, as shown in FIG. 5, assemblies A, including the moving elements 3, the lids 4 and 4b, the rolling elements 5 and the bearings 7, are oppositely disposed on the spline shaft 2. Two group of protrusions 6a are disposed toward outside in the axial direction L.

Furthermore, in the fourth modified example, the spline shaft 2 is formed of substantially pipe-shaped non-magnetic material. In the inner part of the substantially pipe-shape, a magnet 8a is included such that polarities alternate in the axial direction L. In addition, between two lids 4b oppositely disposed on the spline shaft 2, a cylindrical coil 8b is installed so as to contact both end faces of the lids 4b. Furthermore, the two assemblies A and the coil 8b are integrally formed and are disposed in a freely movable manner in the axial direction L of the spline shaft 2. The coil 8b is formed by winding around the coil member and is capable of generating both magnetic poles by means of an electrically connected control portion (not shown). In addition, a linear motor mechanism (driving source) 8 including the magnet 8a and the coil 8b is formed. The coil 8b can be driven in the axial direction L together with the two assemblies A, which are in contact with both ends and are fixed thereto, by means of the linear motor mechanism 8.

According to the ball spline 31, each of the convex portions 6e and the concave portions 6f of the covers 6d which are oppositely disposed are engaged with each other. Thus, for example, even when the lengths of the covers 6d in the axial direction L are short, there is enough length in the axial direction L that fixes the moving elements 3 and the lids 4 and 4b. Thereby, the moving elements 3 and the lids 4 and 4b can be strongly fixed. In addition, the oppositely disposed covers 6d can be precisely positioned relative to each other in the circumferential direction around the spline shaft 2 by means of the convex portions 6e and the concave portions 6f which are engaged with each other.

In addition, protrusions 6a and the bearings 7 are integrally formed, and the protrusions 6a are installed at the lids 4. Furthermore, covers 6d are installed at the lids 4, and all of the members are integrally formed. Thus, the numbers of the components constituting the ball spline 31 can be further reduced, so as to decrease the numbers of the assembling processes, resulting in an improvement in productivity.

In addition, as in the fourth modified example, a linear motor mechanism (driving source) 8 is built in the ball spline (motion device), a moving device having extremely small outer diameter size can be formed. Furthermore, the motion device is excellent in a motion controllability and a positional accuracy, thereby it can be used in various applications.

In addition, the present invention is not limited to the above-described embodiments, but can be variously modified within the scope without departing from the gist of the present invention. For example, while in the present embodiments, motion devices are described using ball splines 1, 11, 21 and 31. However, the present invention is not limited thereto; and other motion devices such as a ball screw or a guide may be employed.

Furthermore, while in the present embodiment, the descriptions are made using a motion device in which the rolling elements 5 are circulated. However, the present invention is not limited thereto; the device can be also applied to a motion device in which the rolling elements 5 are not circulated and the movement direction of the rolling element 5 is limited. In addition, the descriptions are made using balls as the rolling elements 5. However, the present invention is not limited thereto; rollers or the like may be used.

In addition, the spline shaft (orbital element) 2 may not be a linear shape and may be formed in a curved shape. Furthermore, the sectional shape thereof and the number of the rolling groove 2a of the rolling element are also not limited to the present embodiment.

Furthermore, the lids 4 may be divided; for example, the lid 4 may be constituted by the inner peripheral guide portions that support the inner periphery sides of the rolling elements 5 and outer periphery guide portions that support the outer periphery sides of the rolling elements 5.

In addition, although it is described that the caps 6 are fixed by an adhesive; the present invention is not limited thereto. For example, the caps 6 and the moving elements 3 may be each formed by the metallic material and fixed by welding, or may be screw-fixed from the outside to the inside in the diameter direction of the caps 6.

In addition, as shown in FIGS. 1 to 5, the formed base materials (exterior member and cover or the like) of the protrusions 6a are not limited.

Industrial Applicability

The motion device of the present invention can be miniaturized and independently moved, whereby the motion controllability and the positional accuracy are excellent, the motion device can be employed in various applications.

The invention claimed is:
1. A motion device comprising:
an orbital element; and
a moving element into which the orbital element is inserted, the moving element guided so as to be able to reciprocate in a longitudinal direction of the orbital element, wherein
the moving element holds rolling elements therein,
the rolling elements are sealed in an inner portion of the moving element by lids having direction changing paths of the rolling elements therein, the lids being installed at ends of the moving element in the longitudinal direction of the orbital element,
exterior members are installed so as to cover the moving element and the lids,
the moving element and the lids are fixed to each other by the exterior members,
cylindrical protrusions into which the orbital element is inserted are formed at the ends of the moving element and protrude in the longitudinal direction of the orbital element so as to be pivotally supportable on bearings, and
an outer diameter of each of the protrusions in a direction perpendicular to the longitudinal direction of the orbital element is smaller than an outer diameter of the moving element in that direction, and the protrusions are formed integrally with the exterior members.

2. The motion device according to claim 1, wherein rolling surfaces of a bearing rolling element for rolling bearing rolling elements to be built in the bearings are formed on exterior surfaces of the protrusions, and the protrusions and the bearings are integrally formed.

3. The motion device according to claim 1, wherein the moving element holds the rolling elements therein, the rolling elements are sealed in the inner portion of the moving element by the lids installed at the ends of the moving element in the longitudinal direction, and the protrusions are formed integrally with the lids.

4. The motion device according to claim 1, wherein the exterior members are each oppositely disposed at both ends of the moving element, convex portions and concave portions are each formed at ends of the exterior members, the ends facing each other, and the convex portions and the concave portions are disposed so as to be engaged with each other.

5. The motion device according to claim 1, wherein fixation of the moving element and the lids by the exterior members is glued.

6. The motion device according to claim 1, wherein the exterior members are formed integrally with the lids and accordingly are disposed so as to cover the moving element, and the moving element and the lids are fixed to each other by means of the exterior members.

7. A moving device including the motion device according to claim 1, wherein a driving source for driving the motion device in the longitudinal direction of the orbital element.

8. A motion device comprising:

an orbital element; and a moving element into which the orbital element is inserted, the moving element guided so as to be able to reciprocate in a longitudinal direction of the orbital element, wherein the moving element holds rolling elements therein, the rolling elements are sealed in an inner portion of the moving element by lids having direction changing paths of the rolling elements therein, the lids being installed at ends of the moving element in the longitudinal direction of the orbital element, exterior members are installed so as to cover the moving element and the lids, and the moving element and the lids are fixed to each other by the exterior members.

\* \* \* \* \*